United States Patent [19]

Stedman et al.

[11] 4,172,486
[45] Oct. 30, 1979

[54] APPARATUS FOR CLEANING A TRACK ASSEMBLY

[75] Inventors: Robert N. Stedman, Chillicothe; Robert T. McNeely, Peoria, both of Ill.

[73] Assignee: Caterpillar Tractor Co., Peoria, Ill.

[21] Appl. No.: 887,147

[22] Filed: Mar. 16, 1978

[51] Int. Cl.² .............................................. B60S 1/00
[52] U.S. Cl. ................................ 152/185.1; 305/12
[58] Field of Search ................... 152/185.1, 173, 177, 152/182, 184, 187, 189; 305/11, 12, 13, 19

[56] References Cited

U.S. PATENT DOCUMENTS

| 1,261,621 | 4/1918 | Richard | 152/189 |
| 1,560,225 | 11/1925 | Filleul | 152/182 X |
| 2,190,142 | 2/1940 | Ansel | 152/182 X |
| 2,957,509 | 10/1960 | Johnson | 152/173 |
| 3,899,220 | 4/1975 | Grawey et al. | 152/185.1 |
| 4,043,609 | 8/1977 | Vidakovic | 152/185.1 |
| 4,046,428 | 9/1977 | Bauer | 152/185.1 |

Primary Examiner—Joseph F. Peters, Jr.
Assistant Examiner—D. W. Underwood
Attorney, Agent, or Firm—Frank L. Hart

[57] ABSTRACT

A track assembly for a vehicle has a plurality of grousered track shoes and a cleaning member extending between at least two of the shoes. The member moves relative to the track shoes as the track assembly deflects and avoids the packing of dirt and material between the grousers of the track shoes.

9 Claims, 5 Drawing Figures

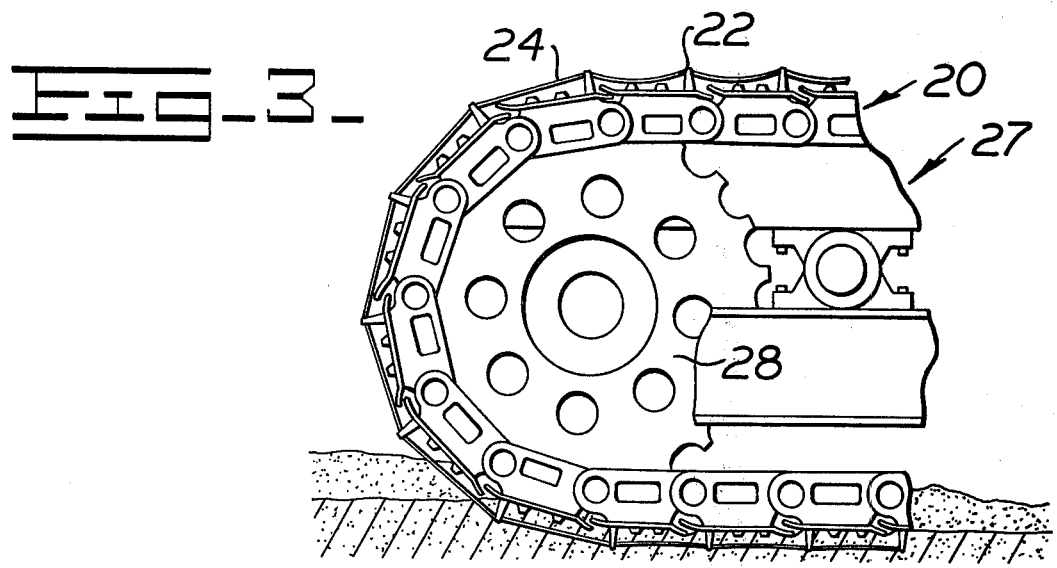
Fig-3-
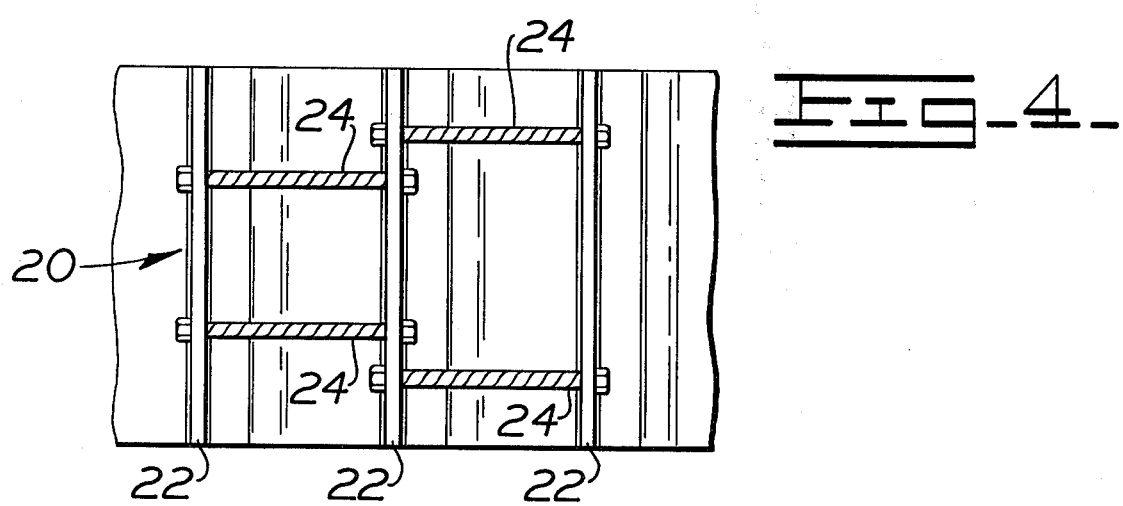
Fig-4-
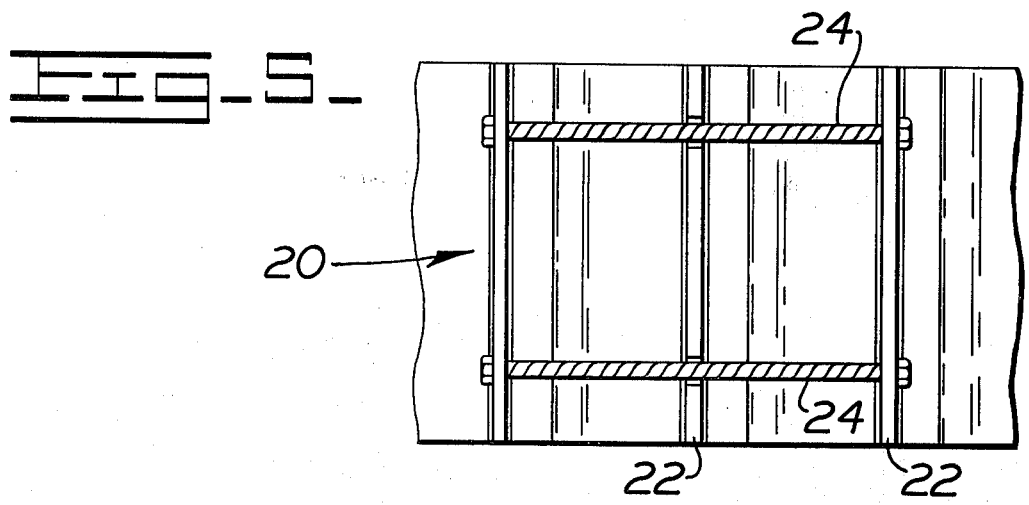
Fig-5-

APPARATUS FOR CLEANING A TRACK ASSEMBLY

BACKGROUND OF THE INVENTION

In recent years, cushioned track assemblies for earthmoving machines have been used to great advantage on certain types of earthmoving applications when working in certain types of soils. The cushioned track with grousered track shoes, when used on a normally rubber tired vehicle, provides increased tire life, added productivity, and greater operator confidence and comfort. However, a problem sometimes develops with conventional track and the cushion track assemblies when the earthmoving machine is working in wet or sticky soils. In such a situation, the soil sometimes has a tendency to stick to the track shoes and tightly pack and fill the space between the grouser bars. With the area between the grouser bars filled with mud or dirt, the grousers are prevented from penetrating into the soil and providing desirable traction for the machine. Wheel slippage and low traction results from such conditions with corresponding waste of time, labor and valuable fuel.

An additional problem develops when the track equipped machine is working on sloping or uneven terrain. If the track shoes and grousers become mud packed, stability of the machine is affected and the machine can undesirably slip and slide. Similar adverse operating conditions exist when the machine is working in ice and snow.

SUMMARY OF THE INVENTION

The present invention is directed to overcoming one or more of the problems as set forth above.

According to the present invention, a track assembly having a plurality of track shoes with grouser bars is provided with a cleaning member extending between at least two of the shoes for avoiding the packing of material on the track. The member moves relative to the shoes, and maintains the track relatively free of mud and foreign material, thereby providing the vehicle with improved traction.

BRIEF DESCRIPTION OF THE DRAWINGS

FIG. 3 is a side view of a portion of a conventional track of a crawler tractor having the apparatus of this invention.

FIG. 4 is a plan view of the track of FIG. 3 having another embodiment of this invention.

FIG. 5 is a plan view of the track of FIG. 3 having yet another embodiment of this invention.

DETAILED DESCRIPTION

Figure 1:
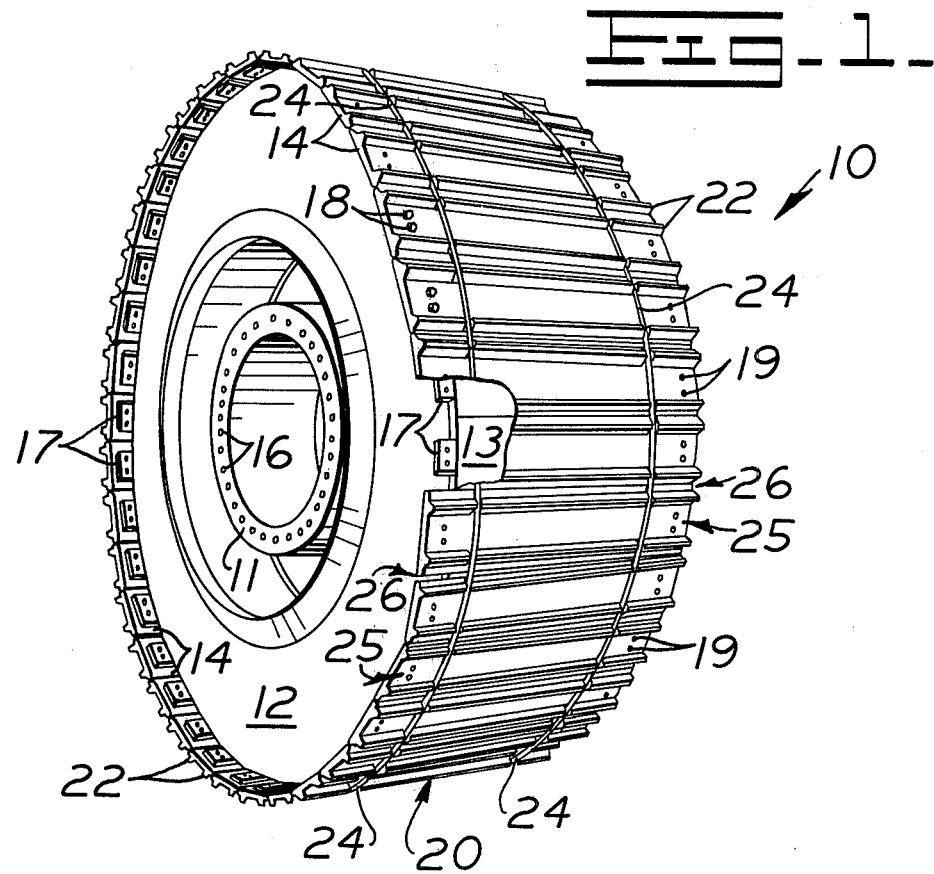
FIG. 1 is a perspective view of a cushioned track assembly having the apparatus of this invention.
Figure 2:
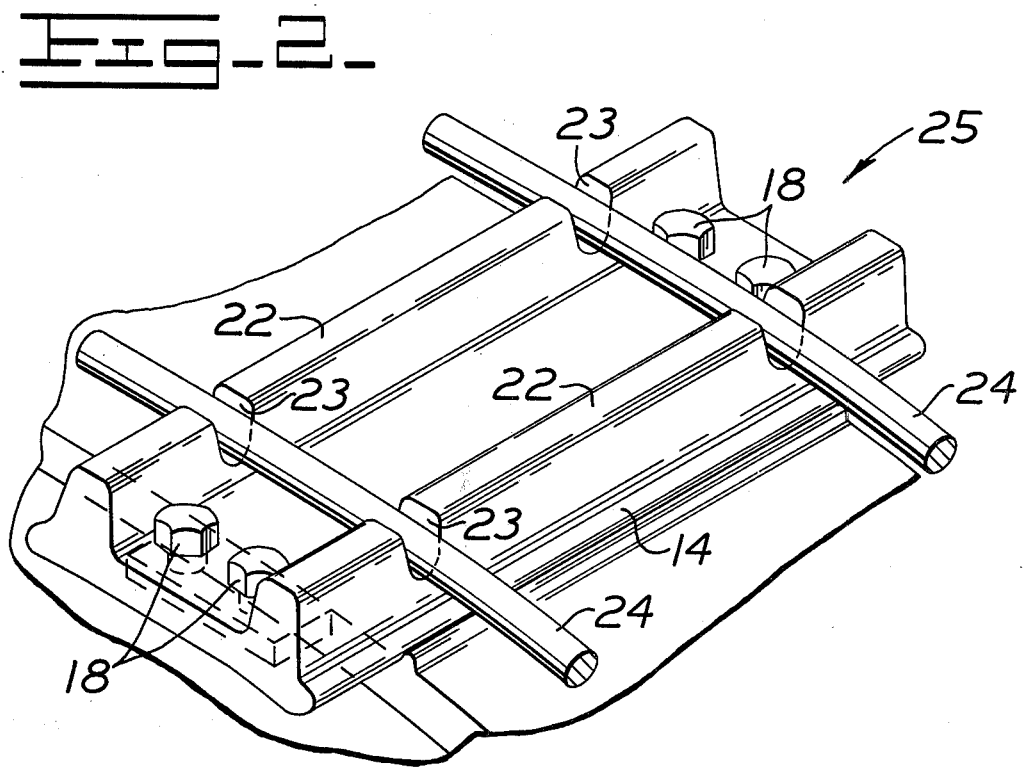
FIG. 2 is an enlarged perspective view of one of the track shoes of FIG. 1 and a portion of the apparatus of this invention.

Referring to FIGS. 1 and 2 of the drawings, a cushioned track assembly 10, as is known in the art, has a rim portion 11, a flexible carcass portion 12, a replaceable mounting belt 13, and a plurality of track shoes 14. The rim 11 is adapted to be secured to an earthworking vehicle via a plurality of mounting holes 16 spaced circumferentially around the rim 11. Once mounted on a vehicle, a plurality of cushioned track assemblies 10 provides support and motive means of improved traction.

The mounting belt 13 contains a plurality of retaining plates 17 molded or otherwise secured to the belt 13. The track shoes 14 encircle the mounting belt 13 in overlapping relationship and are secured to the belt 13 by bolts 18 which pass through holes 19 in the shoes 14. The bolts 18 engage the retaining plates 17, secure the shoes 14 to the mounting belt 13, and form a continuous track assembly 20. Each track shoe 14 has one or more outwardly extending grouser bars 22.

Each grouser bar 22 preferably contains one or more outwardly opening grooves or slots 23. The slots 23 in adjacent grouser bars 22 are in general alignment with each other to form non-continuous channel around the circumference of the cushion track. Preferably, a continuous cleaning member 24 is positioned within the channel formed by the aligned slots and forms a loop or ring. The member 24 is preferably made of steel and is circular in cross section having one end connected to the other and forming a continuous ring extending completely about the respective track assembly. In this preferred form, the member is flexible over substantially each unit of its length, and is not fixed to the grouser bars, but held loosely in place by the slots 23. The inside diameter of the ring shaped member 24 is less than the outer periphery of the grouser bar circle. Owing to this nonrigid, captive relationship of the member 24 by the grouser bar slots 23, the member 24 is movable relative to the bars, while being maintained within the slots 23. In the example illustrated, two members 24 are shown extending about the continuous track. It should be understood, however, that a single ring member 24, or more then two members, can be effectively utilized. It is possible that member 24 could take the form of a steel cable.

It should be understood, however, that the member 24 can be maintained relative to particular grouser bars 22 while permitting restricted movement relative to the respective shoes by any means other than the slots.

Referring to FIG. 3, the member 24 is utilized on a conventional track of a crawler type tractor 27. The member 24 can encircle the continuous track assembly 20, as described above with relation to the cushion type track of FIG. 1. In other embodiments, as shown in FIGS. 4 and 5, the member 24 can extend between two or more of the shoes while not completely encircling the continuous track assembly 20.

In any of the embodiments of this invention, the member 24 is necessarily maintained with its associated shoes 14 while being of a construction sufficient to move relative to said shoes 14 in response to rotation of the continuous track assembly 20. Once the directions of the continuous track assembly 20 and separations of grouser bars 22 during operation have been determined for any particular construction, one skilled in the art can readily size the cleaning member 24.

OPERATION

In the operation of an earthmoving vehicle, equipped with the subject cushion track assembly 20 of FIG. 1, rotation of the track assembly brings a portion of the assembly in contact with the ground, which results in deflection of the flexible carcass 12. This deflection forces the track shoes 14, upward which results in the ring member 24 being urged to move relative to slots 23. The portion of member 24 over that area of the track assembly in contact with the ground is forced inward into the slots. Other portions of the member 24 which are about 180° from the ground engaging portion are forced outward from the slots, owing to the fact that the ring is a relatively rigid continuous member. Outward motion of the member 24 relative to the slots loosens and dislodges packed soil and prevents soil packing between the grouser bars. As the cushion track assembly rotates, a different portion of the member 24 is progressively contacting the ground which results in progressive radial deflection of different portions of the assembly and continual cleaning of the track shoes 14.

A separate and distinct type of motion of member 24 also aids in cleaning the track shoes 14. Since the overall diameter of the member 24 is larger than the tracks, and since there is no rigid connection between the track and the member 24, the member will rotate slower than the track. These differential rotation rates cause the member to rotate about the track, which further avoids the packing of foreign material about the shoes.

In the embodiments of FIGS. 3, 4 and 5, the cleaning member 24 is caused to move relative to the associated shoe 14 in response to contact with the ground, tension placed on the member 24 in response to said contact with the ground, and in response to movement of the shoe 14 about the sprocket wheel 28.

While the invention has been described and shown with particular reference to a preferred embodiment, it will be apparent that other aspects, objects, and advantages can be obtained from a study of the drawing, the disclosure, and the appended claims. The invention is therefore not limited to the particular illustrated embodiment except as defined in the following claims.

The embodiments of the invention in which an exclusive property or privilege is claimed are defined as follows:

1. In a track assembly, having a plurality of track shoes each having a grouser bar and means for connecting the plurality of shoes together and forming a continuous track, the improvement comprising:

a cleaning member maintained relative to and extending transversely across at least two of the shoes and being movable relative to said shoes in response to operating said track assembly for cleaning dirt and material between the grousers of the track shoes.

2. A track assembly, as set forth in claim 1, wherein the member is a continuous member encircling said track assembly.

3. A track assembly, as set forth in claim 2, wherein the member is flexible over substantially each unit of its length.

4. A track assembly, as set forth in claim 2, wherein the inside diameter of the member is less than the outer diameter of the grouser bars.

5. A track assembly, as set forth in claim 1, wherein the member is a cable.

6. A track assembly, as set forth in claim 1, wherein the member is circular in cross-section.

7. A track assembly, as set forth in claim 1, and further including a slot extending through a grouser bar with the cleaning member being positioned in said respective slot.

8. A track assembly, as set forth in claim 1, including a plurality of spaced apart slots in each grouser bar and a plurality of cleaning members each encircling the track assembly and being positioned in respective slots.

9. In an endless track assembly for providing support and motive means for a vehicle, including a plurality of grousered track shoes and means for connecting said shoes together to form an endless track assembly, the improvement comprising:

an elongated cleaning member maintained relative to and extending transversely across the grousers of at least two of said track shoes and being of a construction sufficient to move relative to said shoes in response to movement of said endless track assembly for cleaning dirt and material between the grousers of the track shoes.

* * * * *